United States Patent

Chang et al.

[11] Patent Number: 5,883,187
[45] Date of Patent: Mar. 16, 1999

[54] POLYMER COMPOSITION WITH IMPROVED TOUGHNESS

[75] Inventors: Moh-Ching Oliver Chang, Feeding Hills; Richard Maurice Auclair, Westfield, both of Mass.

[73] Assignee: Bayer Antwerpen S.A./N.V., Antwerp, Belgium

[21] Appl. No.: 952,375

[22] PCT Filed: May 16, 1995

[86] PCT No.: PCT/US95/06172

§ 371 Date: Nov. 7, 1997

§ 102(e) Date: Nov. 7, 1997

[87] PCT Pub. No.: WO96/36651

PCT Pub. Date: Nov. 21, 1996

[51] Int. Cl.[6] .................................................. C08L 55/00
[52] U.S. Cl. ................................ 525/71; 525/80; 525/85; 525/86
[58] Field of Search ................................ 525/80, 86, 71, 525/85

[56] References Cited

U.S. PATENT DOCUMENTS 4,581,408  4/1986  Trabert et al. .............................. 525/66
4,753,988  6/1988  Henton et al. .............................. 525/73
4,880,875  11/1989  Wassmuth et al. ......................... 525/67

FOREIGN PATENT DOCUMENTS 3733839  4/1989  Germany .

*Primary Examiner*—Mark L. Warzel
*Attorney, Agent, or Firm*—Joseph C. Gil; Aron Preis

[57] ABSTRACT

A polymer composition is disclosed comprising (A) a first grafted acrylate rubber substrate having an average rubber phase particle size of from about 0.05 to about 0.2 micron; (B) a second grafted acrylate rubber substrate having an average rubber phase particle size of from about 0.2 to about 2 microns; and (C) a matrix polymer wherein each of the first and second rubber substrates are grafted with (i) a vinyl aromatic monomer; (ii) an unsaturated nitrile monomer; and (iii) optionally a compatible polymerizable comonomer based on the total weight of the grafted rubber substrate wherein at least one of the acrylate rubber substrates is a copolymer of from 83 to 98 percent by weight of an acrylate monomer and from 17 to 2 weight percent of an unsaturated nitrile monomer based on the total weight of the acrylate nitrile monomer copolymer rubber; and wherein the composition has an Izod impact value of at least 80 Joules/meter when tested at 23° C. according to ASTM D-256 using a test specimen of 6.35 cm×1.27 cm×0.32 cm.

9 Claims, No Drawings

POLYMER COMPOSITION WITH IMPROVED TOUGHNESS

BACKGROUND OF THE INVENTION

1. Field of the Invention

This invention relates to a polymer composition comprising an acrylate rubber substrate which is grafted with a vinyl aromatic monomer and an unsaturated nitrile monomer and optionally one or more compatible comonomers. More specifically the invention relates to a grafted acrylate rubber substrate wherein the rubber is a copolymer of butyl acrylate (BA) and a nitrile monomer. The resulting polymer exhibits improved Izod impact strength over similar compositions wherein the butyl acrylate rubber substrate does not contain a nitrile comonomer. The claimed compositions are useful as molding and extrusion compounds.

2. Description of Related Art

Acrylate rubber polymers grafted with styrene and acrylonitrile (ASA polymers) are well known in the art.

U.S. Pat. No. 4,224,419 to Swoboda et al. teaches an ASA polymer which uses a bimodal butyl acrylate substrate. At column 5, lines 5–10 and column 6, lines 64–67 Swoboda teaches using "additional monomers" in the butyl acrylate rubber substrate.

U.S. Pat. No. 4,753,988 to Henton et al. is an improvement on the Swoboda ASA polymer. At column 2, line 35 to column 3, line 4 and claims 2, 3 and 4 Henton teaches using 0 to 20% by weight of a comonomer such as acrylonitrile (AN) or methyl methacrylate (MMA) in the butyl acrylate rubber substrate.

U.S. Pat. No. 4,880,875 to Wassmuth et al. is another improvement on the Swoboda ASA polymer. At column 3, lines 15–51 Wassmuth teaches using 0 to 30% by weight, preferably 20 to 30% by weight of a comonomer, e.g. S, AN or MMA in the BA rubber substrate.

U.S. Pat. No. 5,120,788 to Seitz et al. teaches up to 50% by weight of a comonomer in butyl acrylate rubber substrate in column 3, lines 17–22.

U.S. Pat. No. 5,252,666 to Seitz et al. teaches use of 0.1 to 20% by weight of a hydroxyl alkyl acrylate comonomer in butyl acrylate rubber substrate to obtain improved notched izod impact and lower molding temperature.

SUMMARY OF THE INVENTION

The present invention is directed to a polymer composition comprising (A) a first grafted acrylate rubber substrate having an average rubber phase particle size of from about 0.05 to about 0.2 micron; (B) a second grafted acrylate rubber substrate having an average rubber phase particle size of from about 0.2 to about 2 microns; and (C) a matrix polymer wherein each of the first and second rubber substrates are grafted with (i) a vinyl aromatic monomer; (ii) an unsaturated nitrile monomer; and (iii) optionally a compatible polymerizable comonomer based on the total weight of the grafted rubber substrate wherein at least one of the acrylate rubber substrates is a copolymer of from 83 to 98 percent by weight of an acrylate monomer and from 17 to 2 percent by weight of an unsaturated nitrile monomer based on the total weight of the acrylate nitrile monomer copolymer rubber; and wherein the composition has an Izod impact value of at least 80 joules/meter (J/M) when tested at 23° C. according to ASTM D-256 using a test specimen of 6.35 cm×1.27 cm×0.32 cm. Preferably the Izod value is at least 100 J/M.

DESCRIPTION OF THE INVENTION

The preferred acrylate for use in the present invention is butyl acrylate and the preferred unsaturated nitrile monomer is acrylonitrile.

In a preferred embodiment of the invention, the compositions comprise an acrylate rubber substrate that is bimodal having a first acrylate rubber component that has a weight average rubber phase particle size (RPPS) of from about 0.05 to about 0.2 micron, preferably from about 0.07 to about 0.15 micron and a second acrylate rubber component that has a weight average rubber phase particle size of from about 0.2 to about 2 microns, preferably from about 0.3 to about 0.8 micron. These bimodal compositions are well known in the prior art, e.g. Aubrey et al. U.S. Pat. No. 3,509,237; Swoboda et al. U.S. Pat. No. 4,224,419; Henton et al. U.S. Pat. No. 4,753,988; and Seitz et al. U.S. Pat. No. 4,880,875 and the teaching of these patents are incorporated herein by reference.

When using such bimodal or multimodal rubber systems, at least one of the rubber modes is a butyl acrylate-acrylonitrile copolymer rubber. Preferably, in a bimodal system, both of the rubber modes are butyl acrylate-acrylonitrile copolymer rubbers.

In the present invention, the average RPPS is determined according to the technique detailed in Hoffman, An Improved Technicrue for Particle Size Measurement, Journal of Colloid and Interface Science, Vol. 143, No. 1 (April 1991).

The first and second grafted acrylate rubber components of the present invention are prepared by any of the methods which are well known to those skilled in the art. These grafted rubber components are preferably prepared by polymerizing the styrene and acrylonitrile monomers in the presence of the rubber by emulsion, suspension, bulk or mass polymerization methods. At least a portion of the monomers are combined chemically or grafted onto the rubber substrate and a portion form ungrafted matrix.

In the grafting procedure, the preferred vinyl aromatic monomers are styrene, alpha methyl styrene and the like. The preferred unsaturated nitrile monomers are acrylonitrile and methacrylonitrile. The preferred compatible copolymerizable comonomer is methyl methacrylate. The amounts of the grafting monomers used are from 5 to 40% by weight of acrylonitrile monomer from 95 to 60% by weight of styrene and from 0 to 20% by weight of methyl methacrylate based on the total weight of the acrylonitrile, styrene and methyl methacrylate components used in the grafting procedure.

A portion of the vinyl aromatic and unsaturated nitrile monomers polymerized in the presence of the rubber substrates used to prepare the first and second grafted rubber components will not be grafted to the rubber substrates but will be present as ungrafted polymer e.g. a matrix polymer of polystyrene-acrylonitrile or SAN when styrene and acrylonitrile are used as the grafting monomers. The amount of ungrafted SAN matrix polymer may be increased or decreased depending upon the weight ratio of monomers to rubber, the nature of the rubber, and the conditions of polymerization.

If additional matrix polymer, e.g. poly(styrene acrylonitrile) or SAN is desired it may be prepared separately and added to the blend. Preferably the SAN matrix copolymer is compatible with the grafted rubber components. Preferred matrix copolymers are prepared from vinyl aromatic monomers such as styrene and/or alpha methyl styrene, unsaturated nitrile monomers such as acrylonitrile, methacrylonitrile and optionally one or more comonomers such as methyl methacrylate, maleic anhydride, maleimide such as N-phenyl maleimide, and the like.

Especially preferred SAN matrix copolymers are prepared from styrene and/or alphamethyl styrene and acrylonitrile and/or methacrylonitrile containing 60 to 90% by weight of the styrenic monomer and 40 to 100% by weight of the nitrile monomer.

In the present invention the weight ratio of the first grafted acrylate rubber (the small rubber component or SRC) to the second grafted acrylate rubber (the large rubber component or LRC) is from 10/90 to 90/10, preferably 20/80 to 80/20 and more preferably from 25/75 to 75/25. The amount of acrylate rubber in the composition is from 5 to 45, preferably 10 to 40 percent by weight based on the total weight of the composition. In molding compositions for automotive applications the preferred amount of acrylate rubber is in the range of 10 to 30 percent by weight while in extrusion compositions the preferred amount of rubber is in the range of 15 to 40 percent by weight.

The total amount of matrix polymer in the composition from the grafting step and added matrix polymer is in the range of from 20 to 90, preferably 30 to 80 percent by weight based on the total weight of the grafted rubbers and matrix polymer in the composition. Conversely the total amount of grafted rubber (SRC and LRG) is in the range from 80 to 10, preferably 70 to 20 percent by weight based on the total weight of the grafted rubbers and matrix polymer in the composition.

The grafting step for each of the SRC and the LRC may be carried out separately or the SRC and LRC may be mixed and grafted in a one step operation.

A description of the preparation of the compositions of the present invention based on butyl acrylate-acrylonitrile copolymer rubbers is set forth below. All parts and percentages are by weight unless otherwise indicated. STEPS I and II show the preparation of a butyl acrylate acrylonitrile copolymer. The control examples without acrylonitrile (AN) and those using styrene (S) or methyl methacrylate (MMA) in place of the AN were prepared using similar procedures. It should also be noted that the small mode rubber and the large mode rubber may be grafted separately and then combined after the grafting step.

STEP I. PREPARATION OF A SMALL MODE RUBBER

To a reaction vessel equipped with an agitator and a temperature control system is added:

| Initial Charge | Composition |
| --- | --- |
| 60 | parts water |
| 0.1 | part buffer (sodium bicarbonate) |
| 0.5 | part surfactant [alkylated diphenyl oxide sulfonate (ADPOS)] |

These ingredients are heated with agitation to polymerization temperature (65° C.). During the heating step, the reactor vapor space is purged with nitrogen to remove oxygen which can inhibit free radical polymerizations. Following the heating and purging, the polymerization is started by feeding the following charge to the reactor:

| Delayed Charge | | Composition |
| --- | --- | --- |
| (a) | 96.2 | parts of butyl acrylate (BA) |
| (b) | 3.2 | parts acrylonitrile (AN) |
| (c) | 0.6 | part diallyl maleate (DAM) |
| (d) | 0.44 | part tridecyl sodium sulfosuccinate (TSS) |
| (e) | 1.0 | part ADPOS as an aqueous solution |
| (f) | 0.16 | part potassium persulfate (PPS) as an aqueous solution |

Charges (a) to (d) above are metered into the reactor over a 4 hour time period, (e) is charged over 4½ hours and (f) is fast charged in less than 5 minutes at the beginning of the delayed charge.

About 2 hours after the initiation of polymerization, a second fast charge of initiator (0.06 part PPS as an aqueous solution) is added to the reactor to maintain the polymerization reaction rate. The polymerization temperature is controlled at 65° C. until about one half hour after the metered monomer addition is completed at which time the completed rubber latex is cooled to room temperature and discharged from the reactor. The finished latex solids is 35% and the rubber particle size is about 0.12 micron.

STEP II. PREPARATION OF A LARGE MODE RUBBER

To a reaction vessel equipped with an agitator and a temperature control system is added:

| Initial Charge | Composition |
| --- | --- |
| 45 | parts water |
| 0.1 | part sodium bicarbonate buffer |
| 7 | parts small mode latex (35% solids) from STEP I above |

These ingredients are heated with agitation and nitrogen purging as in STEP I above to polymerization temperature (65° C.). Following the heat-up and purging, the polymerization is started by charging the following to the reactor.

| Delayed Charge | | Composition |
| --- | --- | --- |
| (a) | 96.2 | parts butyl acrylate (BA) |
| (b) | 3.2 | parts acrylonitrile (AN) |
| (c) | 0.6 | part of diallyl maleate (DAM) |
| (d) | 0.44 | part TSS |
| (e) | 0.16 | part PPS |

Metered charges (a) to (d) above are charged over a 4 hour period and (e) is fast charged in less than 5 minutes at the beginning of the delayed charge. A second fast charge (<5 minutes) of 0.24 part of initiator (PPS) as an aqueous solution is made 2 hours after initiation of polymerization to maintain the polymerization reaction rate. About 15 minutes after the monomer additions are complete, a fast charge of surfactant (1.0 part ADPOS) is added as an aqueous solution to impart increased shear stability to the latex. The polymerization temperature is maintained at 65° C. until about one half hour following the end of the monomer addition at which time the rubber latex is cooled to room temperature and discharged from the reactor. The finished rubber latex solids is 35% and the rubber particle size is about 0.4 micron.

STEP III. PREPARATION OF GRAFTED RUBBER

To a reaction vessel equipped with an agitator and a temperature control system is added 138 parts of small mode rubber latex (138 parts) from STEP I above and 54 parts of large mode rubber latex from STEP II above. The ratio of small to large rubber solids is 72:28 by weight. The latex blend is heated with agitation and nitrogen purging to polymerization temperature (70° C.). Following the heating and purging steps the graft polymerization is started by charging the following to the reactor:

|     | Charge | Composition |
| --- | --- | --- |
| (a) | 29.2 | parts of styrene (S) |
| (b) | 9.7 | parts of acrylonitrile (AN) |
| (c) | 0.15 | part of tert-dodecyl mercaptan (t-DM) |
| (d) | 0.05 | part of sodium bicarbonate buffer |
| (e) | 0.56 | part of ADPOS surfactant (in aqueous solution) |
| (f) | 0.16 | part of PPS initiator |
| (g) | 0.04 | part of PPS |

Charges (a) to (f) above are metered into the reaction vessel over a 3 hour period while (g) is fast charged in less than 5 minutes at the beginning of the run. The polymerization temperature is maintained at 70° C. until about one half hour following the end of the metered charges at which point the grafted latex is cooled to room temperature and discharged from the reactor. The finished latex solids is 40%.

STEP IV. RECOVERY OF THE GRAFTED RUBBER

The grafted bimodal rubber latex prepared in STEP III above is mixed with a SAN latex (40% solids) and metered to a hot (~90° C.) 2% solution of Epsom Salts to coagulate the latex to form a slurry of the grafted rubber crumb. The slurry is dewatered using centrifugation/filtration processes yielding a grafted rubber crumb which is then dried with hot air. The total rubber content of the crumb is 55% by weight.

STEP V. THE MATRIX POLYMER

The separately prepared matrix polymers used in the working examples are SAN I which is a copolymer of alpha methyl styrene and acrylonitrile with an acrylonitrile content of 32% and SAN II which is a copolymer of styrene and acrylonitrile with an acrylonitrile content of about 32%. Both are conventional polymers which are well known in the art.

SAMPLE PREPARATION

In the following examples the following formulation is used:

| Parts by wt | Component |
| --- | --- |
| 40 | Grafted rubber (55% rubber) |
| 37.2 | SAN I |
| 22.8 | SAN II |
| 0.5 | Tinuvin 328 stabilizer |
| 0.5 | Tinuvin 770 stabilizer |
| 0.3 | Irganox 1076 stabilizer |
| 1 | Acrawax C lubricant |
| 0.1 | DC-200 silicone oil |
| 4.3 | Color concentrate |

The color concentrate contains 25% by weight of carbon black dispersed in 75% by weight of SAN matrix polymer. The above ingredients are melt compounded using a Banbury Mixer followed by pelletizing. The total rubber content of the resulting compositions is 23% by weight based on the total weight of the composition.

The pellets are dried in an air-circulating oven at a temperature of 75° C. for about 16 hours then molded on a 80 metric ton Engel molding machine. The molding conditions used for obtaining physical test specimens involved molding one 10.2 cm×7.6 cm×0.26 cm plaque with one 12.7 cm×1.27 cm×0.32 cm bar or two 12.7 cm×1.27 cm×1.27 cm bars. The molding conditions used were stock temperature 240° C., mold temperature 66° C., injection speed adjusted to achieve a 2 second injection time, injection pressure equal to minimum molding pressure (MMP) plus 21.1 kg/cm$^2$, post injection pressure equal to MMP plus 7 kg/cm$^2$, screw speed 35 rpm, and back pressure 8.2 kg/cm$^2$. Minimum molding pressure is defined as the pressure necessary to fill the 10.2 cm×7.6 cm×0.26 cm plaque cavity to the knockout pins (approximately 1.3 cm from the bottom edge of the cavity and is considered to be 90% filled at that point). MMP was determined with all injection speeds set to 5.1 cm/second, post injection pressure set to zero, while gradually increasing the injection pressure by bars until the cavity was filled just to the knockout pins. This injection pressure equaled MMP.

All the specimens were conditioned at A23° C. and 50% relative humidity for at least 48 hours before tested for impact as described below.

TEST METHODS

Inverted Dart Impact (IDI)—A dart with a hemispherical head having a diameter of 0.013 meter is used, against which the specimens is driven at a constant speed of 3.39 meters/second. This is in accordance with the procedure set forth in ASTM D 3763. The specimen thickness was 0.26 cm, the ring diameter was 3.2 cm. Tests were run at room temperature (R.T.) and −30° C. and the results are expressed in Joules.

Izod Impact (J/m)—Uses a falling pendulum with 5.4 Joules of energy to strike a fixed specimen. The height of the pendulum swing after striking is a measure of the energy absorbed and thus indicates impact strength. Tests were run at 23° C. (R.T.) at −30° C. and the results are expressed in Joules/meter in accordance with the procedures set forth in ASTM D 256. The Izod I8 test was run on samples 6.35 cm×1.27 cm×0.32 cm and the I2 test which uses a thicker sample was run on samples 6.35 cm×1.27 cm×1.27 cm. The use of I2 and I8 tests impact at varying thickness. The test specimens were milled with a 0.25 mm radius notch at midpoint to a remaining width of 10.2 mm.

EXAMPLES 1 TO 12

The following Examples 1 to 12 illustrate the improved properties that are obtained with the use of small amounts of acrylonitrile (AN) as a comonomer in the preparation of the butyl acrylate rubber. In each example, a small rubber component (SRC) and a large rubber component (LRC) are used. These samples are prepared as described above.

TABLE I

Summary of Examples 1 to 12
Based on a BA/AN Rubber Substrate

|  |  | % AN | | IMPACT TEST RESULTS*** | | | | | |
|  |  | | | IZOD 12 | | IZOD 18 | | IDI | |
| Example | SRC/LRC* | LRC | SRC | R.T. | −30° C. | R.T. | −30° C. | R.T. | −30° C. |
| --- | --- | --- | --- | --- | --- | --- | --- | --- | --- |
| 1 | 40/60 | 5 | 0 | 77 | 23 | 105 | 19 | 22 | 0.6 |
| 2 | 40/60 | 10 | 0 | 88 | 22 | 116 | 16 | 29 | 0.4 |
| 3 | 40/60 | 15 | 0 | 88 | 16 | 82 | 13 | 29 | 0.3 |
| 4 | 40/60 | 20 | 0 | 90 | 20 | 101 | 13 | 31 | 0.2 |
| 5 | 40/60 | 10 | 10 | 129 | 21 | 123 | 18 | 29 | 0.3 |
| 6 | 70/30 | 0 | 10 | NT | NT | 100 | 17 | 29 | 0.5 |
| 7** | 40/60 | 1.5 | 0 | 81 | NT | NT | 18 | 18 | NT |
| 8 (control A) | 40/60 | 0 | 0 | 51 | 26 | 64 | 21 | 20 | 1.0 |
| 9 (control B) | 70/30 | 0 | 0 | NT | NT | 66 | 22 | 18 | 0.9 |
| 10 | 70/30 | 3.6 | 3.6 | 122 | 28 | 108 | 22 | 34 | 1.0 |
| 11 | 40/60 | 25 | 0 | VB | VB | VB | VB | VB | VB |
| 12 | 40/60 | 20 | 20 | 69 | 14 | 56 | 12 | 15 | 0.3 |

*weight ratio of small rubber component (SRC) to large rubber component (LRC)
**contains 3.5 wt % styrene in the LRC
***samples tested at room temperature (R.T.) and −30° C.; VB means very brittle; NT means not tested Referring to Table I, Examples 1 to 6 which contain small amounts of AN have significantly improved IZOD impact over Controls A and B which do not contain AN. Examples 5 and 10 which contain AN in both the SRC and the LRC exhibit unexpectedly high IZOD impact values. Note Example 11 where 25% by weight of AN in the copolymer rubber causes brittleness in the resulting polymer. In Example 12, when using 20% by weight of AN in both the small and large rubber components, the impact results are in the range of the control examples which do not contain AN. Moreover, the room temperature IDI values are lower. The optimum levels of AN used in each of the LRC and SRC copolymer rubbers are in the range of from about 2 to about 17, preferably from about 2.5 to about 13 weight percent based on the total weight of the copolymer rubber.

EXAMPLES 13 TO 21

In these examples, styrene (S) and/or methyl methacrylate (MMA) are used in place of the AN in the preparation of the butyl acrylate rubber. IZOD and FDI impact tests were carried out and the results reported in Table II below

TABLE II

Summary of Examples 13 to 21
Based on BA/S and BA/MMA Rubber Substrate

|  |  | % S | | % MMA | | IMPACT TEST RESULTS** | | | | | |
|  |  | | | | | IZOD 12 | | IZOD 18 | | IDI | |
| Example | SRC/LRC* | LRC | SRC | LRC | SRS | R.T. | −30° C. | R.T. | −30° C. | R.T. | −30° C. |
| --- | --- | --- | --- | --- | --- | --- | --- | --- | --- | --- | --- |
| 13 (control C) | 40/60 | 0 | 0 | 0 | 0 | 55 | 27 | 66 | 22 | 18 | 0.9 |
| 14 (control D) | 70/30 | 0 | 0 | 0 | 0 | NT | NT | 75 | 21 | 24 | 0.9 |
| 15 | 40/60 | 5 | 0 | 0 | 0 | 68 | 24 | 101 | 23 | 18 | 0.9 |
| 16 | 40/60 | 10 | 0 | 0 | 0 | 61 | 24 | 84 | 17 | 12 | 0.5 |
| 17 | 40/60 | 0 | 5 | 0 | 0 | 60 | 25 | 74 | 25 | 22 | 0.5 |
| 18 | 40/60 | 5 | 5 | 0 | 0 | 71 | 23 | 109 | 20 | 16 | 0.6 |
| 19 | 40/60 | 5 | 10 | 0 | 0 | 67 | 20 | 93 | 17 | 16 | 0.4 |
| 20 | 40/60 | 0 | 0 | 5 | 0 | 61 | 24 | 79 | 20 | 15 | 0.9 |
| 21 | 40/60 | 0 | 0 | 5 | 5 | 67 | 23 | 84 | 19 | 22 | 0.8 |

*weight ratio of small rubber component (SRC) to large rubber component (LRC)
**samples tested at room temperature (R.T.) and −30° C.
NT means not tested A comparison of the results in Table II using styrene and methyl methacrylate as the copolymer in the butyl acrylate rubber with the results in Table I where AN is used as the copolymer, clearly shows the superior results obtained with AN.

We claim:

1. A composition comprising (A) a first grafted acrylate rubber substrate having an average rubber phase particle size of from about 0.05 to about 0.2 micron; (B) a second grafted acrylate rubber substrate having an average rubber phase particle size of from about 0.2 to about 2 microns; and (C) a matrix polymer wherein each of the first and second rubber substrates are grafted with (i) a vinyl aromatic monomer; (ii) an unsaturated nitrile monomer; and (iii) optionally a compatible polymerizable comonomer wherein at least one of the acrylate rubber substrates is a copolymer of from about 83 to about 98 percent by weight of an acrylate monomer and from about 2 to about 17 percent by weight of an unsaturated nitrile monomer based on the total weight of the acrylate rubber; and wherein the composition has an Izod impact value of at least 80 J/m when tested at 23° C. according to ASTM D-256 using a test specimen of 6.35 cm×1.27 cm×0.32 cm.

2. A composition as in claim 1 wherein the first and second grafted rubber substrates are copolymers of butyl acrylate and acrylonitrile.

3. A composition as in claim 2 wherein the first and second grafted rubber substrates are copolymers of butyl acrylate and acrylonitrile wherein the acrylonitrile content in each substrate is in the range of from about 2.5 to about 13 percent by weight based on the total weight of the butyl acrylate and acrylonitrile in the rubber substrates.

4. A composition as in claim 3 wherein the first grafted acrylate rubber substrate has an average rubber phase particle size of from about 0.07 to 0.15 micron and wherein the second grafted acrylate rubber substrate has an average rubber phase particle size of 0.3 to 0.8 micron.

5. A composition as in claim 1 wherein the IZOD impact is at least 100 J/m.

6. A composition as in claim 1 wherein the average rubber phase particle size of the first and second grafted acrylate rubber substrates is substantially the same.

7. A composition as in claim 1 wherein the ratio of the first grafted acrylate rubber to the second grafted acrylate rubber is in the range of 20/80 to 80/20.

8. A composition as in claim 1 wherein the total amount of the grafted acrylate rubber substrate in the composition is in the range 5 to 45 percent by weight based on the total weight of the composition.

9. A composition as in claim 1 wherein the total amount of matrix polymer in the composition is from 20 to 90 percent based on the total weight of the grafted rubber substrates and the matrix polymer in the composition.

* * * * *